US012579073B2

(12) United States Patent　　(10) Patent No.: US 12,579,073 B2

Pathapati et al.　　(45) Date of Patent:　Mar. 17, 2026

(54) APPARATUS AND METHOD FOR INTELLIGENT MEMORY PAGE MANAGEMENT

(71) Applicant: Intel Corporation, Santa Clara, CA (US)

(72) Inventors: Neha Pathapati, San Jose, CA (US); Lidia Warnes, Roseville, CA (US); Durgesh Srivastava, Cupertino, CA (US); Francois Dugast, Rennes (FR); Navneet Singh, Bangalore (IN); Rasika Subramanian, Redwood City, CA (US); Sidharth N. Kashyap, Edinburgh (GB)

(73) Assignee: Intel Corporation, Santa Clara, CA (US)

( * ) Notice: Subject to any disclaimer, the term of this patent is extended or adjusted under 35 U.S.C. 154(b) by 700 days.

(21) Appl. No.: 17/751,557

(22) Filed: May 23, 2022

(65) Prior Publication Data

US 2022/0283951 A1　　Sep. 8, 2022

(51) Int. Cl.
| | |
|---|---|
| *G06F 12/0882* | (2016.01) |
| *G06F 9/50* | (2006.01) |
| *G06F 18/214* | (2023.01) |
| *G06N 3/045* | (2023.01) |

(52) U.S. Cl.
CPC ........ *G06F 12/0882* (2013.01); *G06F 9/5016* (2013.01); *G06F 18/214* (2023.01); *G06N 3/045* (2023.01); *G06F 2209/5011* (2013.01)

(58) Field of Classification Search
None
See application file for complete search history.

(56) References Cited

U.S. PATENT DOCUMENTS

| | | | |
|---|---|---|---|
| 10,901,894 B2 * | 1/2021 | John | ................... G06F 12/0864 |
| 11,307,986 B1 * | 4/2022 | Maruf | ................... G06N 20/10 |
| 11,914,860 B2 | 2/2024 | Lai et al. | |
| 2002/0032823 A1 | 3/2002 | Scardamalia et al. | |

(Continued)

OTHER PUBLICATIONS

Battle, Rick, "Machine Learning Feature Selection for Tuning Memory Page Swapping", Thesis, Naval Postgraduate School, Monterey, CA, USA, Sep. 2013, 55 pages.

(Continued)

*Primary Examiner* — Yaima Rigol
(74) *Attorney, Agent, or Firm* — Compass IP Law PC

(57) ABSTRACT

A method is described. The method includes determining that a memory page is in one of an active state and an idle state from meta data that is maintained for the memory page. The method includes recording a past history of active/idle state determinations that were previously made for the memory page. The method includes training a neural network on the past history of the memory page. The method includes using the neural network to predict one of a future active state and future idle state for the memory page. The method includes determining a location for the memory page based on the past history of the memory page and the predicted future state of the memory page, the location being one of a faster memory and a slower memory. The method includes moving the memory page to the location from the other one of the faster memory and the slower memory.

20 Claims, 7 Drawing Sheets

(56) References Cited

U.S. PATENT DOCUMENTS

| | | | | |
|---|---|---|---|---|
| 2009/0113143 A1 | 4/2009 | Domsch et al. | | |
| 2011/0072204 A1 | 3/2011 | Chang et al. | | |
| 2013/0166834 A1 | 6/2013 | Mayhew et al. | | |
| 2014/0281158 A1* | 9/2014 | Ravimohan | ......... | G06F 12/0246 711/103 |
| 2016/0092362 A1 | 3/2016 | Barron et al. | | |
| 2017/0177500 A1 | 6/2017 | Shanbhogue et al. | | |
| 2018/0081816 A1 | 3/2018 | Coburn et al. | | |
| 2019/0018813 A1 | 1/2019 | Das Sharma | | |
| 2019/0243756 A1* | 8/2019 | Ray | ..................... | G06F 12/0873 |
| 2019/0361811 A1* | 11/2019 | Saeki | .................. | G06F 12/0862 |
| 2020/0019506 A1* | 1/2020 | Ray | ..................... | G06F 12/0871 |
| 2020/0193268 A1* | 6/2020 | Blagodurov | .......... | G06F 3/0442 |
| 2020/0326871 A1* | 10/2020 | Wu | ........................ | G06F 3/0647 |
| 2022/0179799 A1* | 6/2022 | Erickson | ............. | G06F 12/0882 |
| 2023/0051103 A1* | 2/2023 | Roberts | .................... | G06N 3/04 |
| 2024/0192880 A1* | 6/2024 | Zhang | .................. | G06F 18/214 |

OTHER PUBLICATIONS

Doudali, Thaleia et al., "Kleio: A Hybrid Memory p. Scheduler with Machine Intelligence" HPDC '19: Proceedings of the 28th International Symposium on High-Performance Parallel and Distributed Computing, Phoenix, AZ, USA, Jun. 22-29, 2019, pp. 37-48.

Jimenez, Daniel A. et al., "Dynamic Branch Prediction with Perceptrons", Proceedings HPCA Seventh International Symposium on High-Performance Computer Architecture, Jan. 19-24, 2001, 10 pages.

Maity, Biswadip et al., "Self-aware Memory Management for Emerging Energy-efficient Architectures", 2020 11th International Green and Sustainable Computing Workshops (IGSC), Pullman, WA, USA, Oct. 19-22, 2020, 8 pages.

"Compute Express Link" Specification, Revision: 2.0, Version 0.9, Jul. 2020, 660 pages.

Lu, Kai, et al., "Flexible Page-level Memory Access Monitoring Based on Virtualization Hardware", VEE '17: Proceedings of the 13th ACM SIGPLAN/SIGOPS International Conference on Virtual Execution Environments, https://doi.org/10.1145/3050748.3050751, Apr. 2017, 13 pages.

Menage, Paul et al., "Control Groups", The Linux kernel user's and administrator's guide, Control Groups Version 1, https://www.kernel.org/doc/html/latest/admin-guide/cgroup-v1/cgroups.html, Portions Copyright 2004-2006, 14 pages.

RedHat 2.10., "2.10. Generating the /etc/cgconfig.conf File", Red Hat Customer Portal, https://access.redhat.com/documentation/en-us/red_hat_enterprise_linux/6/html/resource_management_guide/sec-cgsnapshot, 2017, 4 pages.

RedHat 4.3., "4.3. Per-group Division of CPU and Memory Resources", Red Hat Customer Portal, https://access.redhat.com/documentation/en-us/red_hat_enterprise_linux/6/html/resource_management_guide/sec-cpu_and_memory-use_case, 2013, 8 pages.

RedHat, "Resource Management using Control Groups in Red Hat® Enterprise Linux, Case Study: Database Performance". Red Hat Reference Architecture Series, Version 1.0, Nov. 2010, 27 pages.

Rothman, Jeffrey B., et al., "Sector Cache Design and Performance", Computer Science Division, University of California Berkeley, Jan. 1999, 63 pages.

* cited by examiner

APPARATUS AND METHOD FOR INTELLIGENT MEMORY PAGE MANAGEMENT

BACKGROUND

Centralized (e.g., cloud) or other data center application software runtime environments demand fast execution of highly complex software processes. Developers of such application software programs are therefore constantly seeking ways to reduce the propagation and/or execution times of these processes.

FIGURES

DETAILED DESCRIPTION

Figure 1:
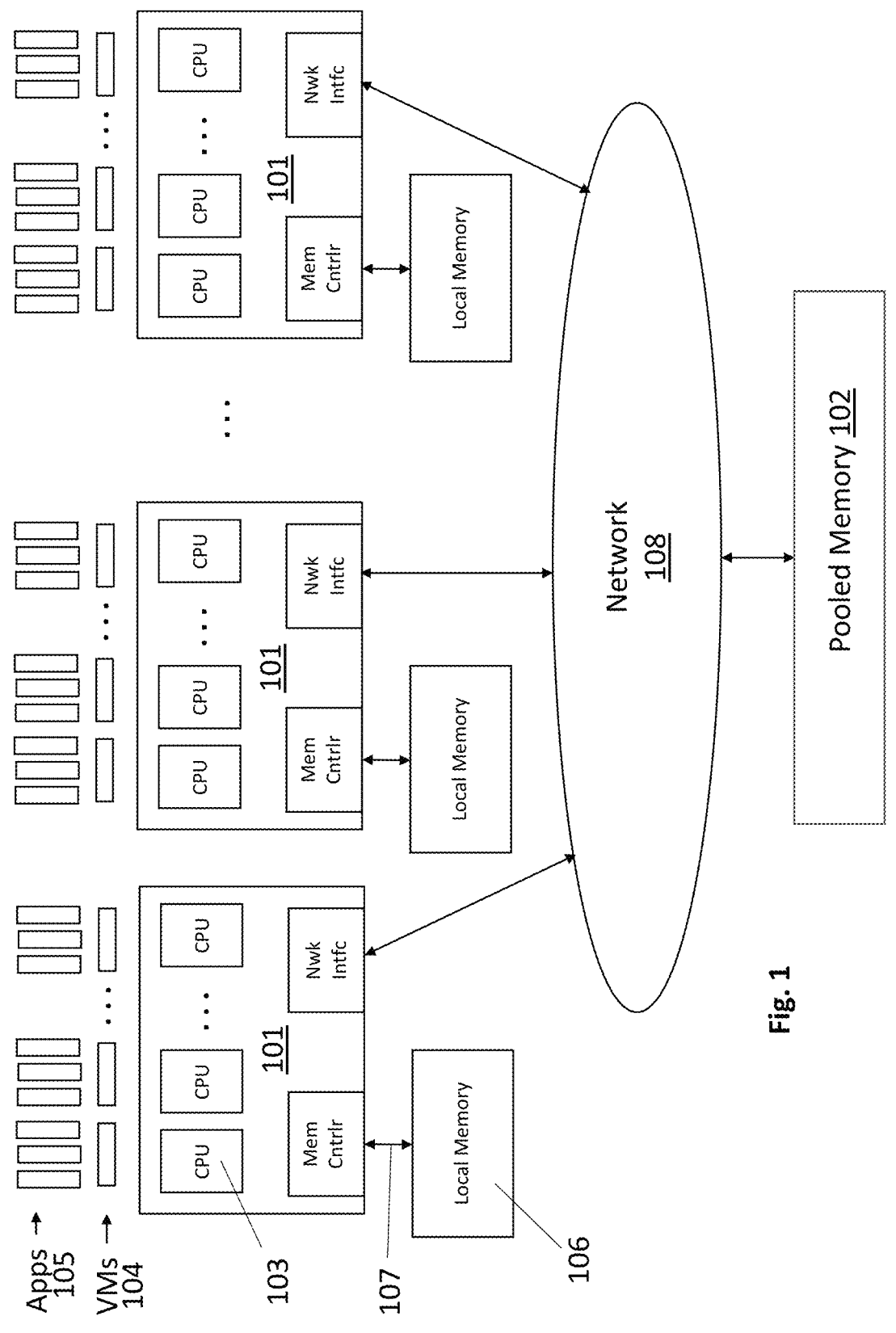
FIG. 1 shows a large scale computing architecture.

FIG. 1 shows a typical large scale computing (e.g., data center) architecture. As observed in FIG. 1, a plurality of multi-core processors 101 are communicatively coupled to a memory pool 102. Each processor 101 includes a number of central processing unit (CPU) general purpose processing cores 103 (hereinafter "CPU cores" or simply "cores"). For illustrative ease only one of the CPU cores is labeled in FIG. 1. The CPU cores typically execute multiple respective virtual machines 104. Operating system instances typically execute on the VMs and application software 105 typically executes on the operating system instances.

The processors 101, or other semiconductor chips (not shown in FIG. 1) can include accelerators and/or specialized processors such as graphics processors, neural network engines (e.g., for artificial intelligence functions such as machine learning and inference execution), image processors, etc. The CPU cores 103 and accelerators typically operate out of memory. Here, both the cores 103 and accelerators typically operate on large amounts of data which are stored in memory. The CPU cores 103 and at least some of the accelerators also execute some form of program code which is also stored in memory.

There are two kinds of memory observed in FIG. 1: local memory 106 and pooled memory 102 (for illustrative ease only one of the local memories is labeled in FIG. 1). Local memory 106 is memory that is physically closer to a CPU core or accelerator than the memory pool 102. Typically, local memory 106 is integrated on or directly coupled to the semiconductor logic chip 101 that a core/accelerator is integrated on. Local memory 106 is typically packaged into a memory module and coupled to the core's/accelerator's logic chip 101 by a bus and/or point to point link 107. Examples of such memory modules include a dual in-line memory module (DIMM) and a stacked memory module (e.g., a High Bandwidth Memory (HBM) memory stack).

Pooled memory 102, by contrast, is memory that is available to the cores and accelerators but is more remote (e.g., is reachable over a local, campus or metropolitan (or larger) area network 108). The presence of the network 108 or other remote connection introduces propagation delay between the cores/accelerators and the memory pool 102 that exceeds that of the cores'/accelerators' respective local memory 106. As such, from the perspective of the cores/accelerators, local memory 106 is "faster" than pooled memory 102.

The data and/or program code of a particular software program 105 that executes on a processing core or accelerator is typically organized into "pages" that are stored in memory (whether local or pooled). Each page keeps the data/code for a continuous range of memory addresses. Certain addresses across a program's entire range of memory space correspond to page boundaries that delineate which of the program's addresses correspond to which of the program's pages.

For any particular program, typically, certain ones of the program's pages are more frequently accessed than others of the program's pages. As such, ideally, the pages that are more frequently accessed are kept in local memory 106 whereas the pages that are less frequently accessed are kept in pooled memory 102. By so doing, the program observes faster memory responses for its more frequently accessed memory addresses and slower memory responses for its less frequently accessed memory addresses.

Figure 2:
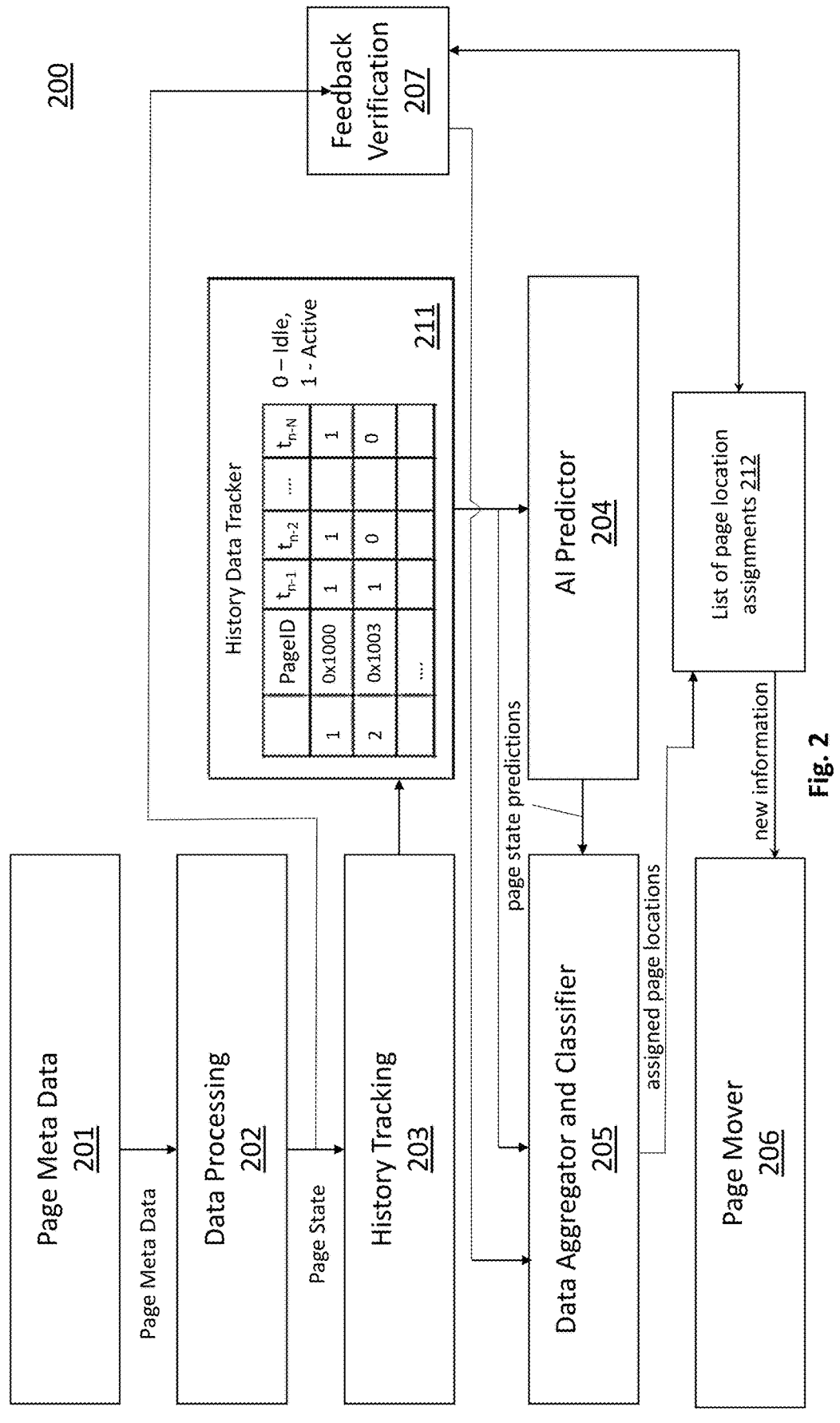
FIG. 2 shows a system for determining a memory page location.

FIG. 2 shows an architecture of a process flow ("flow") 200 that can be executed by, or on behalf of, a software program to determine which of the program's pages should be placed in local memory 106 and which of the program's pages should be placed in pooled memory 102. As observed in FIG. 2 the process 201 includes multiple stages which are described in detail below.

A first stage, referred to as a page meta data stage 201, is responsible for managing statistical data on a software program's pages. Here, meta data can be tracked for each memory page that is instantiated for the software program. Examples of such meta data include (but are not limited to): 1) a timestamp of when the page was last accessed; 2) a set of entries that list respective timestamps of the past N accesses of the page; 3) how many times the page has been accessed in the past M seconds or minutes; 4) how many times the page has been swapped between memory and non-volatile storage in the past R seconds or minutes; etc.

As described in more detail below, the meta data that is recorded for a software program's pages is further processed by the flow's following stages to determine which of the program's pages should be resident in local memory and which of the program's pages should be resident in pooled memory. However, in various embodiments, the page meta stage 201 is a more global function that supports other processes/functions than just the determination of page memory location.

For example, keeping meta data that tracks how frequently a page is being moved between memory and non-volatile storage is more germane to the handling of the software program by the larger computer system that the program is executing upon rather than the memory. As such, in various embodiments, less than all of the meta data that is collected for a program's pages by the meta data stage 201 is useful to the flow 200 of FIG. 2.

A second stage, referred to as a data processing stage 202, extracts the page meta data information that is useful to the flow 200 of FIG. 2, processes it, and then organizes the results of the processing into a format that the flow 200 of FIG. 2 accepts as input information. In an embodiment, the processing entails making a decision on each page that the data processing stage processes the meta data of as to whether the page is "active" or whether the page is "idle". Note that the active/idle characterization that is assigned to a page is different than the location of the page (at any moment of time, some active pages can be in pooled memory and some idle pages can be in local memory).

Here, the meta data is processed by the data processing stage 202 to produce some metric on how frequently the page is accessed (which can recorded directly in the page meta data or determined from the page meta data). The metric is then compared to a threshold. If the metric crosses the threshold the page is deemed "active". Contra-wise, if the metric does not cross the threshold, the page is deemed "idle". A page's active/idle status can be referred to as the page's current state. Thus, the data processing stage 202 processes page meta data to determine the state of a program's pages.

In various embodiments the data processing stage 202 is continually determining the respective page state for a stream of pages that the meta data stage 201 is continually compiling the meta data for. That is, for example, in an embodiment, the page meta data stage 201 is continually monitoring the program's memory requests and updating, on a page by page basis, the meta data for the pages that are called out by the program's memory request stream. The data processing stage 202 continually scrolls through the meta data information and determines, on a page by page basis, the page state of each page.

Alternatively, the page meta data stage 201 keeps an ordered list of the most recent memory requests that identifies the respective page targeted by each request. The data processing stage 202 then scrolls through the ordered list and processes the meta data for each different page that is represented in the list. Processing the meta data in this manner focuses the attention of the data processing stage 202 only on those pages whose meta data is actively being updated.

Regardless, the data processing stage 202 emits a steady stream of states for the pages that the software program is directing memory requests to.

The following history data tracker stage 203 records the page state history over time of, e.g., every page that has been instantiated for the software program or every page that is currently instantiated in memory for the software program. As observed in FIG. 2, in an embodiment, the page state history can be represented as a table 211 that identifies each page (e.g., by base memory address) along a first (vertical) axis and identifies page state for each of a continuous stream of time increments in the past along a second (horizontal) axis.

Here, the state of all pages being tracked are recorded in time increments $t_{n-1}$, $t_{n-2}$, $t_{n-3}$, etc., where, e.g., an equal amount of time is presumed to exist between each successive (neighboring) time increment. Here, $t_{n-1}$ corresponds to the most recent recorded state history, $t_{n-2}$ corresponds to the second most recent recorded state history, etc. That is, moving to the right along the horizontal axis of the table corresponds to moving backward in time.

The amount of time between successive time increments can correspond, e.g., to the amount of time it takes the data processing stage 202 to scroll through the meta data for all of the pages that the page meta data stage is keeping meta data for, or, a time window in which the software program issued a sequence memory requests, or a fixed amount of runtime of the software program according to some global clock, or, some other amount of time that accounts for any difference in state observed for a same page across sequential time increments.

The page state history 211 is then fed to an artificial intelligence stage 204 and a data aggregator stage 205. The artificial intelligence stage analyzes the history record and predicts the state of the pages for time increments yet to come (time increments in the future).

In an embodiment, the artificial intelligence stage 204 makes state predictions for the software program's pages for multiple, future time increments. For example, the artificial intelligence stage 204 makes an active/idle prediction for each of the software program's pages for three future time increments, $t_{n+1}$, $t_{n+2}$, $t_{n+3}$, where $t_{n+1}$ is the next/immediate time increment in the future, $t_{n+2}$ is the time increment that follows $t_{n+1}$ in the future and $t_{n+3}$ is the time increment that follows $t_{n+2}$ in the future.

Figure 3:
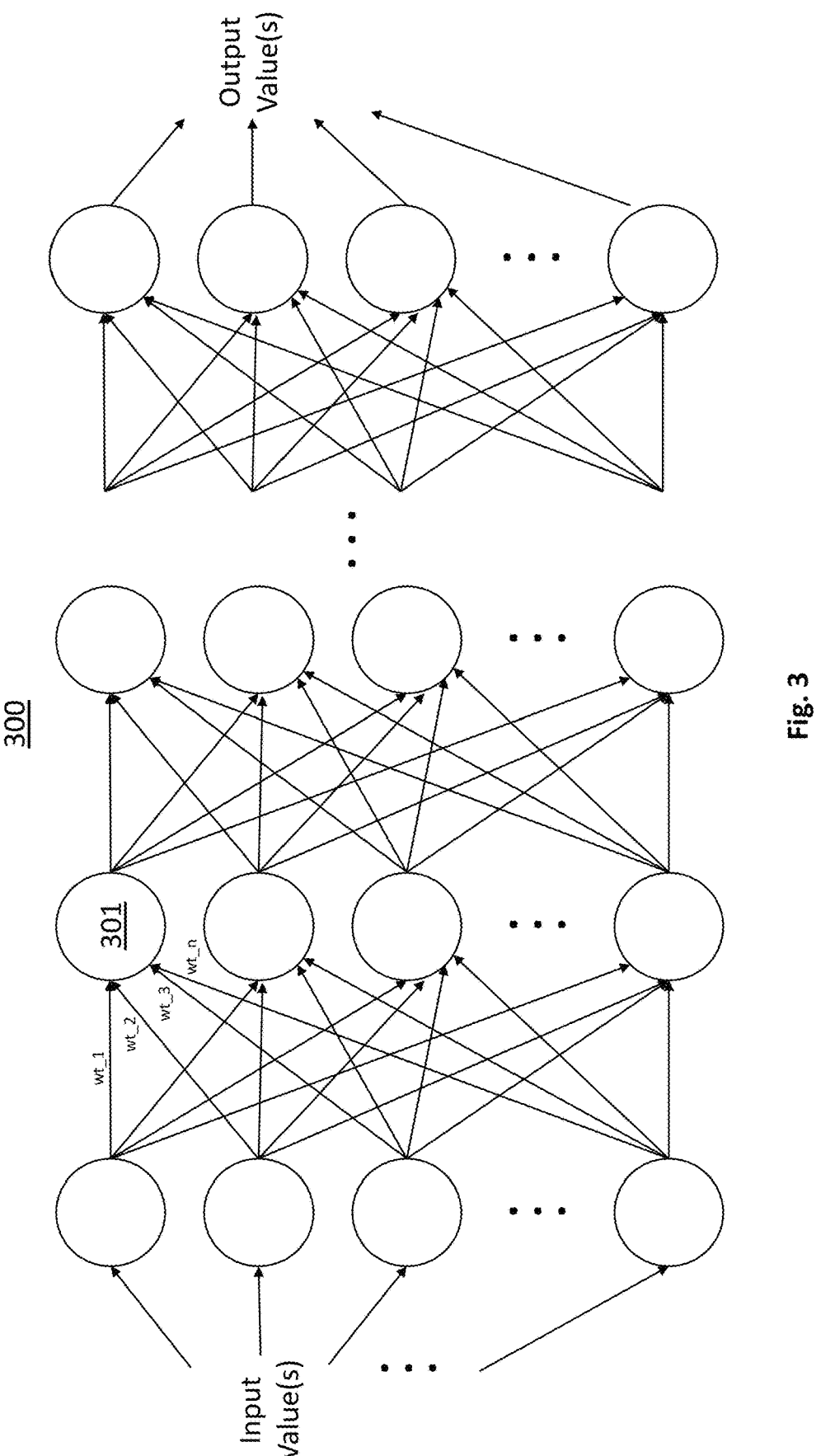
FIG. 3 shows a neural network.

As is known in the art, artificial intelligence functions can be implemented with a neural network circuit (and/or software written to perform a neural network algorithm). FIG. 3 depicts an exemplary neural network 300. As observed in FIG. 3 the inner layers of a neural network can largely be viewed as layers of neurons that each receive weighted outputs from the neurons of other (e.g., preceding) layer(s) of neurons in a mesh-like interconnection structure between layers.

The weight of the connection from the output of a particular preceding neuron to the input of another subsequent neuron is set according to the influence or effect that the preceding neuron is to have on the subsequent neuron (for ease of drawing only one neuron 301 and the weights of input connections are labeled). Here, the output value of the preceding neuron is multiplied by the weight of its connection to the subsequent neuron to determine the particular stimulus that the preceding neuron presents to the subsequent neuron.

A neuron's total input stimulus corresponds to the combined stimulation of all of its weighted input connections. According to various implementations, the combined stimulation is calculated as a multi-dimensional (e.g., vector) multiply accumulate operation. Here, output values from preceding neurons are multiplied by their respective weights to produce a set of products. The set of products are then accumulated (added) to generate the input stimulus to the receiving neuron.

A (e.g., non-linear or linear) mathematical function is then performed using the stimulus as its input which represents the processing performed by the receiving neuron. That is, the output of the mathematical function corresponds to the output of the neuron which is subsequently multiplied by the respective weights of the neuron's output connections to its following neurons. The neurons of some extended neural-networks, referred to as "thresholding" neural networks, do not trigger execution of their mathematical function unless the neuron's total input stimulus exceeds some threshold. Although the particular exemplary neural network of FIG. 3 is a purely "feed forward" structure, other neural networks may exhibit some feedback, back propagation or changing weights based on feedback in their data flows.

In various embodiments, referring back to FIG. 2, the artificial intelligence stage 204 continually executes machine learning algorithms upon the past history information 211 as the past history information 211 is continually updated. The machine learning (also referred to as training), e.g., determines updated weights for the mesh interconnections of a neural network. In an embodiment, the artificial intelligence stage 204 trains multiple neural networks (one neural network for each different expanse of time into the future for which a prediction is made).

After training, the artificial intelligence stage 204 next applies input data to its neural networks to generate the desired page state predictions (a process referred to as inferencing). For example, the artificial intelligence stage 204 applies the most recent set of page states generated by the data processing stage 202 at time to before they are entered into the $t_{n-1}$ column of the history table 211.

Figure 4:
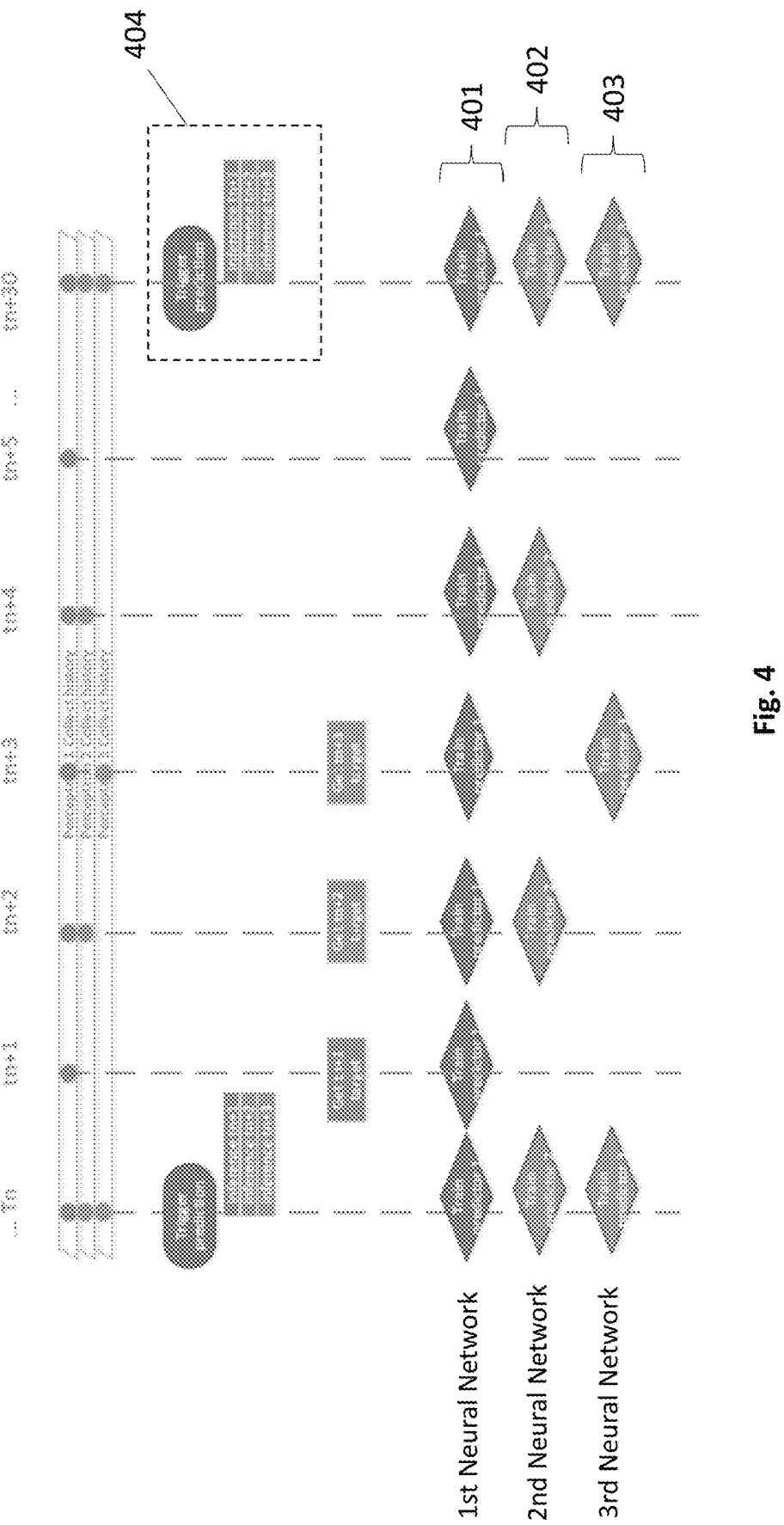
FIG. 4 shows a method for predicting future memory page active/idle states.

FIG. 4 depicts a more detailed example of the above described training and inferencing processes. In the example of FIG. 3, three different neural networks are implemented by the artificial intelligence engine 204: 1) a first neural network ("predictor 1") that is used to make predictions for a next time increment $t_{n+2}$; 2) a second neural network ("predictor 2") that is used to make predictions for a second next time increment $t_{n+2}$; and, 3) a third neural network ("predictor 3") that is used to make predictions for a third next time increment $t_{n+3}$.

Here, referring back to the exemplary history record 211 of FIG. 2, with each next time increment, new page state information is entered in the $t_{n-1}$ column of the record 211, all other information is pushed to the right by one column (the information that previously existed in the $t_{n-1}$ column is pushed into the $t_{n-2}$ column, the information that previously existed in the $t_{n-2}$ column is pushed into the $t_{n-3}$ column, etc.). Thus, the contents of the record 211 change with each time increment.

FIG. 4 shows a particular approach in which a next set of predictions (inferences) from all three neural networks is generated every thirty time increments. That is, a new set of predictions are generated after every thirty times the $t_{n-1}$ column of the history table 211 is updated with new page state information.

Here, as observed in FIG. 4, the first neural network is re-trained 401 from the history data 211 every time the history 211 is updated with new information. That is, the first neural network is re-trained 401 with the contents of the record 211 as it exists at every time increment after a new column of information has been inserted into the $t_{n-1}$ column.

By contrast, the second neural network is re-trained 402 from the contents of the history record 211 every other time the record 211 is updated with new information (the second neural network is trained 403 from the contents of the record 211 as it exists after every other time increment). Further still, the third neural network is re-trained 403 from the contents of the history record 211 every third time the record is updated with new information (the third neural network is trained 403 from the contents of the record 211 as it exists after every third time increment).

According to this approach, after thirty time increments, the first neural network will have been updated with new weights 30 times, the second neural networks will have been updated with new weights 15 times and the third neural network will have been updated with new weights 10 times. All of these are considered to be sufficient training intervals. As such, all three neural networks concurrently provide a new prediction 404 every 30 time increments. In various embodiments, the predictions 404 provided by each of the neural networks take the form of a vector with a different location in the vector being reserved for each different page that was identified in the history table 211. The neural network uniquely generates a "1" or "0" in each vector location thereby articulating the prediction for each location's particular page (a "1" corresponds to a prediction that the page will be active and a "0" corresponds to a prediction that the page will be idle).

Notably, the different training schemes 401, 402, 403 for the neural networks correspond to the different distances into the future that the different neural networks respectively make predictions for. Specifically, because the first neural network is expected to predict a page's state in the immediately next time increment, the first neural network is trained 401 to observe page state changes across successive time increments. By contrast, because the second neural network is expected to predict a page's state in the second next time increment, the second neural network is trained 402 to observe page state changes every other time increment. Finally, because the third neural network is expected to predict a page's state in the third next time increment, the third neural network is trained to observe page state changes every third time increment.

In the particular training example of FIG. 4, a total time expanse of thirty time increments is used to issue all three predictions 404. Here, training over an extended expanse of time increments not only helps the machine learning processes 401, 402, 403 confirm true patterns in the page states, but also, helps diminish thrashing of pages between the local and pooled memory locations. Here, if a page is first deemed to be properly placed in the local memory and then shortly after deemed to be properly placed in the pooled memory, and then the reverse, and then the entire process repeated, the page would continually be moving back and forth between the local and pooled memories rather than being kept in one of the locations.

It is pertinent to point out that other embodiments may choose to make fewer predictions into the future (e.g., just $t_{n+1}$ and $t_{n+2}$) and/or train over longer or shorter time increment expanses (e.g., fewer or more than thirty). As such, the teachings herein should not be limited to the specific details of the example of FIG. 4.

Referring back to FIG. 2, the data aggregator and classifier stage 205 accepts both the predictions from the artificial intelligence stage 204 and the page state history 211 as input data. The data aggregator and classifier stage 205 then combines both the future predictions and the past history for a particular page to decide whether the appropriate memory location for that page is the local memory or the pooled memory. According to one embodiment, a number (e.g., K) of past histories of the page are randomly selected from the history record 211 and listed along with the (e.g., three) predictions made for the page by the artificial intelligence stage 204. Here, again, a prediction or history of "active" can be assigned a 1 whereas a prediction or history of "idle" can be assigned a 0. Thus, a list/collection of 1s and/or 0s are accumulated for a particular page.

A numeric average is then taken on the values in the page's list/collection. If the average is greater than 0.6 or 0.7, for example, the page is deemed to be appropriately placed in the local memory, whereas, if the average is less than 0.4 or 0.3, for example, the page is deemed to be appropriately placed in the pooled memory. Here, the algorithm is assigning pages to the local memory that are "strongly active" (e.g., average greater than 0.7) where, e.g., both the predictions and past history together indicate the page is active and will remain active. Similarly, the algorithm is assigning pages to the pooled memory that are "strongly idle" (e.g., average greater less than 0.3) where, e.g., both the predictions and past history together indicate the page is idle and will remain idle.

Skewing the threshold for assignment to the local memory and the threshold for assignment to the pooled memory in this manner again avoids thrashing of a page between local and pooled memories. That is, for averages near 0.5, the system is having difficulty determining whether the page should be stored in local memory or pooled memory. As such, no assignment is made to these pages. If over time their meta data causes a change in their numerical average that forcefully leans in one direction of the other, the data aggregator and classifier stage 205 can then assign a memory location to them.

It is important to note that a myriad of other approaches can be used to determine the correct memory location for a page based on the past history record and the predictions. For example, the same approach as described can be used but where different coefficient values are assigned to some or all of the past history data items and the future predictions. Here, for instance, more recent past history data items can have a higher coefficient value than older past history data items, and/or, more distant future predictions have less weight than more imminent future predictions, and/or, where at least some past history data items have higher coefficients than at least some future predictions (location decision is weighted more from past history), and/or, where at least some past history data items (e.g., the oldest past history data items) have lower coefficients than future predictions (location decision favors at least some predictions more heavily than the oldest past history data).

After the data aggregator and classifier stage 205 has decided upon the correct memory location for some number of pages, the identities of the pages and their proper locations are stored into a persisted list 212 that identifies the pages that the flow 200 has made decisions on and the proper locations for those pages as determined by the flow 200. Any new information provided by the data aggregator and classifier 205 (such as the addition of one or more new pages to the list 212, and/or, a change in location of a page that already exists on the list 212).

The page mover stage 206 moves any page associated with the new information that is presently in a location that is different than its assigned location as listed in list 212. That is, those pages that were assigned to local memory but are physically stored in pooled memory are moved up to local memory. Similarly, those pages that were assigned to pooled memory but are physically stored in local memory are moved down to pooled memory.

In various embodiments, to protect against situations where the number of pages to be moved is large enough to clog datapaths to/from local memory and/or pooled memory, the page mover stage 206 has integrated intelligence to control the rate at which page movements are made. According to one embodiment, the page mover stage 206 does not allow the rate of page movements to exceed the lesser of: 1) some fixed percentage of available bandwidth at the memory pool interface; 2) a bandwidth calculated as some fixed percentage of the number of pages in the history record 211 being moved within a single time increment.

The flow 200 of FIG. 2 also includes an ancillary feedback and verification stage 207 that detects page location determination errors made by the flow 200. That is, the feedback and verification stage 207 compares the assigned locations of the pages on the list 212 against the active/idle characterizations of these same pages as determined by the front end of the flow. Here, recall that the data processing stage 202 determines the active/idle state of the software program's pages based on their current meta data.

If the feedback and verification stage 207 determines that a page has been assigned an incorrect location (a consistently active page is assigned to the memory pool or a consistently idle page is assigned to the local memory), the feedback and verification stage 207 informs the data aggregator and classifier stage 205 of the mistake. In response, the data aggregator and classifier stage 205 recognizes that whatever formulation was used to determine the appropriate location for the page (e.g., the number past histories used in the formulation, the coefficients assigned to the past histories and predictions, etc.) yielded an incorrect result. The data aggregator and classifier stage 205 therefore proceeds to determine a new formulation for the page that would have assigned the correct location for the page (e.g., to be used in future assignments for the page). Multiple instances of incorrect assignments for multiple pages can also be analyzed to identify patterns and adjust formulations (e.g., globally to all page assignments) accordingly.

With respect to how the feedback and verification stage 207 determines that a page has been assigned an incorrect location, as depicted in FIG. 2, the active/idle state characterizations made by the data processing stage 202 is forwarded to the feedback and verification stage 207 as input information. In other embodiments the feedback and verification stage 207 can accept the input active/idle input information from the history record 211 or the meta data stage 201. In the case of the former (input taken from history record 211), for example, if some percentage (e.g., 60%, 70%, 80%) of recent state characterizations as recorded in the history record 211 (e.g., most recent 10 or 20 time increments) for any particular page are opposite the page's location assignment, the feedback and verification stage 207 can decide that the page's assigned location is incorrect.

In the case of the later (input taken from raw meta data), the feedback and verification stage 207 is processing the page meta data directly and can use some criteria other than the active/idle characterizations to determine flow assignment errors.

The feedback and verification stage 207 can also be used to detect when the flow is thrashing any particular page (the flow rapidly toggles a page's location assignment between local and pooled memory). For example, the feedback and verification controller can monitor how often location changes are being made to a particular page that is listed on the page location assignment list 212 and flag the same as a thrash. The thrash can be resolved, for example, by preventing location changes until after some period of time has expired. In a further or alternate embodiment, a timestamp is associated with each page location entry in the list 212 that identifies when the last change was made to the page's location assignment. Any subsequent changes to be applied to the page are ignored until after some period of time has elapsed beyond the timestamp.

Although embodiments above have stressed that the memory that is more distant than the local memory is a pooled memory, more generally, the pooled memory can be viewed as a type of remote memory (being architecturally farther from the local memory). Other kinds of remote memories can exist (e.g., where the local memory is on chip and the remote memory is off chip). Furthermore, other characteristics can result in one memory being faster and another memory being slower from the perspective of a CPU core or accelerator that can execute out of both memories. For example, the faster memory can be implemented with DRAM memory while the slower memory can be implemented with, e.g., three-dimensionally stacked, resistive non-volatile cells that are byte addressable (e.g., Optane™ memory from Intel Corporation of Santa Clara, California). As such, the teachings above can apply not only more generally to local/remote memory environments but also even more generally to any tiered memory in which one level/tier exhibits faster response times than another level/tier.

CPU cores, accelerators, specialized processors and the like that can execute out of a tiered memory can each be viewed, more generally, as a type of processor.

Figure 5:
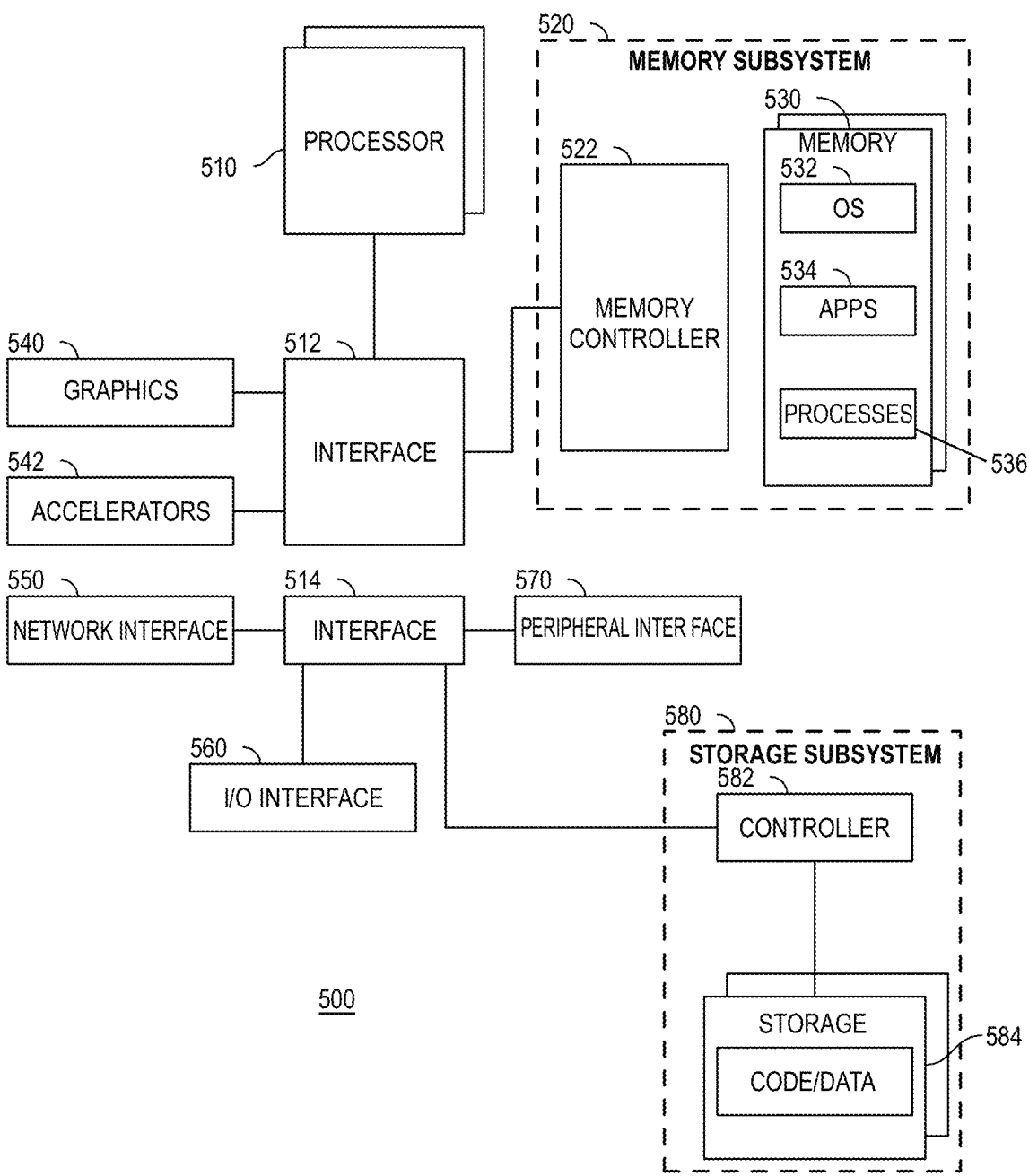
FIG. 5 shows a system.
Figure 6:
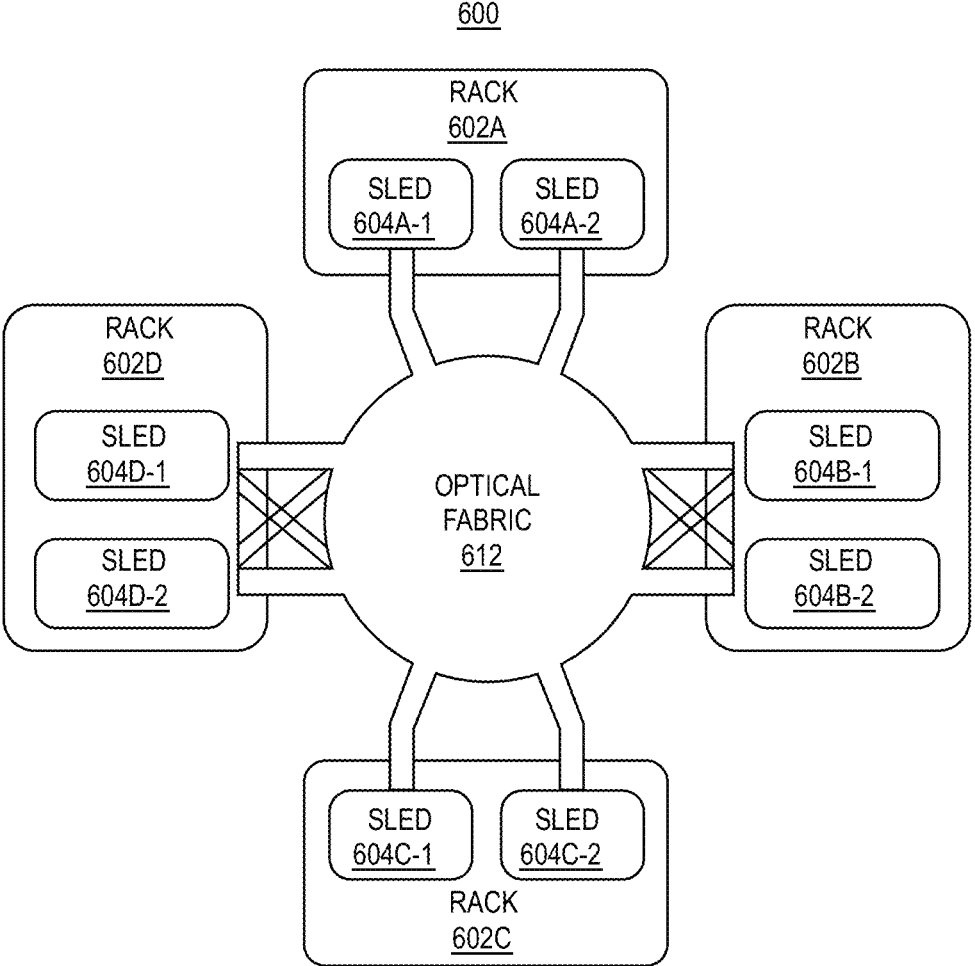
FIG. 6 shows a data center.
Figure 7:
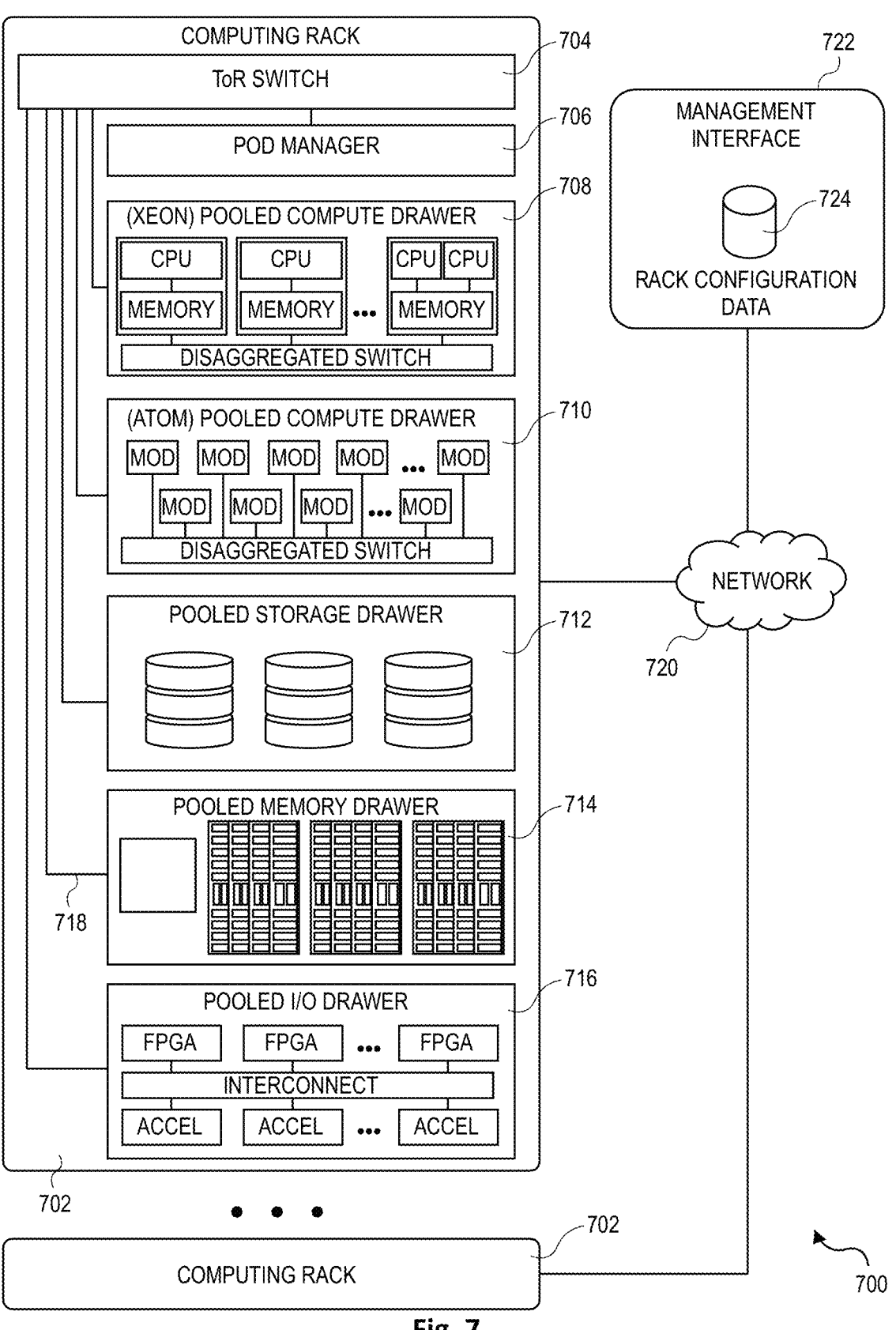
FIG. 7 shows a rack.

The following discussion concerning FIGS. 5, 6, and 7 are directed to systems, data centers and rack implementations, generally. FIG. 5 generally describes possible features of an electronic system that can perform the page memory location determination process described above. FIG. 6 describes possible features of a data center that can include such electronic systems. FIG. 7 describes possible features of a rack having one or more such electronic systems installed into it.

FIG. 5 depicts an example system. System 500 includes processor 510, which provides processing, operation management, and execution of instructions for system 500. Processor 510 can include any type of microprocessor, central processing unit (CPU), graphics processing unit (GPU), processing core, or other processing hardware to provide processing for system 500, or a combination of processors. Processor 510 controls the overall operation of system 500, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Certain systems also perform networking functions (e.g., packet header processing functions such as, to name a few, next nodal hop lookup, priority/flow lookup with corresponding queue entry, etc.), as a side function, or, as a point of emphasis (e.g., a networking switch or router). Such systems can include one or more network processors to perform such networking functions (e.g., in a pipelined fashion or otherwise).

In one example, system 500 includes interface 512 coupled to processor 510, which can represent a higher speed interface or a high throughput interface for system components that needs higher bandwidth connections, such as memory subsystem 520 or graphics interface components 540, or accelerators 542. Interface 512 represents an interface circuit, which can be a standalone component or integrated onto a processor die. Where present, graphics interface 540 interfaces to graphics components for providing a visual display to a user of system 500. In one example, graphics interface 540 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 540 generates a display based on data stored in memory 530 or based on operations executed by processor 510 or both. In one example, graphics interface 540 generates a display based on data stored in memory 530 or based on operations executed by processor 510 or both.

Accelerators 542 can be a fixed function offload engine that can be accessed or used by a processor 510. For example, an accelerator among accelerators 542 can provide compression (DC) capability, cryptography services such as public key encryption (PKE), cipher, hash/authentication capabilities, decryption, or other capabilities or services. In some embodiments, in addition or alternatively, an accelerator among accelerators 542 provides field select controller capabilities as described herein. In some cases, accelerators 542 can be integrated into a CPU socket (e.g., a connector to a motherboard or circuit board that includes a CPU and provides an electrical interface with the CPU). For example, accelerators 542 can include a single or multi-core processor, graphics processing unit, logical execution unit single or multi-level cache, functional units usable to independently execute programs or threads, application specific integrated circuits (ASICs), neural network processors (NNPs), "X" processing units (XPUs), programmable control logic circuitry, and programmable processing elements such as field programmable gate arrays (FPGAs). Accelerators 542, processor cores, or graphics processing units can be made available for use by artificial intelligence (AI) or machine learning (ML) models. For example, the AI model can use or include any or a combination of a reinforcement learning scheme, Q-learning scheme, deep-Q learning, or Asynchronous Advantage Actor-Critic (A3C), convolutional neural network, recurrent convolutional neural network, or other AI or ML model. Multiple neural networks, processor cores, or graphics processing units can be made available for use by AI or ML models.

Memory subsystem 520 represents the main memory of system 500 and provides storage for code to be executed by processor 510, or data values to be used in executing a routine. Memory subsystem 520 can include one or more memory devices 530 such as read-only memory (ROM), flash memory, volatile memory, or a combination of such devices. Memory 530 stores and hosts, among other things, operating system (OS) 532 to provide a software platform for execution of instructions in system 500. Additionally, applications 534 can execute on the software platform of OS 532 from memory 530. Applications 534 represent programs that have their own operational logic to perform execution of one or more functions. Processes 536 represent agents or routines that provide auxiliary functions to OS 532 or one or more applications 534 or a combination. OS 532, applications 534, and processes 536 provide software functionality to provide functions for system 500. In one example, memory subsystem 520 includes memory controller 522, which is a memory controller to generate and issue commands to memory 530. It will be understood that memory controller 522 could be a physical part of processor 510 or a physical part of interface 512. For example, memory controller 522 can be an integrated memory controller, integrated onto a circuit with processor 510. In some examples, a system on chip (SOC or SoC) combines into one SoC package one or more of: processors, graphics, memory, memory controller, and Input/Output (I/O) control logic circuitry.

A volatile memory is memory whose state (and therefore the data stored in it) is indeterminate if power is interrupted to the device. Dynamic volatile memory requires refreshing the data stored in the device to maintain state. One example of dynamic volatile memory incudes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory), JESD235, originally published by JEDEC in October 2013, LPDDR5, HBM2 (HBM version 2), or others or combinations of memory technologies, and technologies based on derivatives or extensions of such specifications.

In various implementations, memory resources can be "pooled". For example, the memory resources of memory modules installed on multiple cards, blades, systems, etc. (e.g., that are inserted into one or more racks) are made available as additional main memory capacity to CPUs and/or servers that need and/or request it. In such implementations, the primary purpose of the cards/blades/systems is to provide such additional main memory capacity. The cards/blades/systems are reachable to the CPUs/servers that use the memory resources through some kind of network infrastructure such as CXL, CAPI, etc.

The memory resources can also be tiered (different access times are attributed to different regions of memory), disaggregated (memory is a separate (e.g., rack pluggable) unit that is accessible to separate (e.g., rack pluggable) CPU units), and/or remote (e.g., memory is accessible over a network).

While not specifically illustrated, it will be understood that system 500 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect express (PCIe) bus, a HyperTransport or industry standard architecture (ISA) bus, a small computer system interface (SCSI) bus, Remote Direct Memory Access (RDMA), Internet Small Computer Systems Interface (iSCSI), NVM express (NVMe), Coherent Accelerator Interface (CXL), Coherent Accelerator Processor Interface (CAPI), Cache Coherent Interconnect for Accelerators (CCIX), Open Coherent Accelerator Processor (Open CAPI) or other specification developed by the Gen-z consortium, a universal serial bus (USB), or an Institute of Electrical and Electronics Engineers (IEEE) standard 1394 bus.

In one example, system 500 includes interface 514, which can be coupled to interface 512. In one example, interface 514 represents an interface circuit, which can include standalone components and integrated circuitry. In one example, multiple user interface components or peripheral components, or both, couple to interface 514. Network interface 550 provides system 500 the ability to communicate with remote devices (e.g., servers or other computing devices) over one or more networks. Network interface 550 can include an Ethernet adapter, wireless interconnection components, cellular network interconnection components, USB (universal serial bus), or other wired or wireless standards-based or proprietary interfaces. Network interface 550 can transmit data to a remote device, which can include sending data stored in memory. Network interface 550 can receive data from a remote device, which can include storing received data into memory. Various embodiments can be used in connection with network interface 550, processor 510, and memory subsystem 520.

In one example, system 500 includes one or more input/output (I/O) interface(s) 560. I/O interface 560 can include one or more interface components through which a user interacts with system 500 (e.g., audio, alphanumeric, tactile/touch, or other interfacing). Peripheral interface 570 can include any hardware interface not specifically mentioned above. Peripherals refer generally to devices that connect dependently to system 500. A dependent connection is one where system 500 provides the software platform or hardware platform or both on which operation executes, and with which a user interacts.

In one example, system 500 includes storage subsystem 580 to store data in a nonvolatile manner. In one example, in certain system implementations, at least certain components of storage 580 can overlap with components of memory subsystem 520. Storage subsystem 580 includes storage device(s) 584, which can be or include any conventional medium for storing large amounts of data in a nonvolatile manner, such as one or more magnetic, solid state, or optical based disks, or a combination. Storage 584 holds code or instructions and data in a persistent state (e.g., the value is retained despite interruption of power to system 500). Storage 584 can be generically considered to be a "memory," although memory 530 is typically the executing or operating memory to provide instructions to processor 510. Whereas storage 584 is nonvolatile, memory 530 can include volatile memory (e.g., the value or state of the data is indeterminate if power is interrupted to system 500). In one example, storage subsystem 580 includes controller 582 to interface with storage 584. In one example controller 582 is a physical part of interface 514 or processor 510 or can include circuits in both processor 510 and interface 514.

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base, and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Such non-volatile memory devices can be placed on a DIMM and cooled according to the teachings above.

A power source (not depicted) provides power to the components of system 500. More specifically, power source typically interfaces to one or multiple power supplies in system 500 to provide power to the components of system 500. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 500 can be implemented as a disaggregated computing system. For example, the system 500 can be implemented with interconnected compute sleds of processors, memories, storages, network interfaces, and other components. High speed interconnects can be used such as PCIe, Ethernet, or optical interconnects (or a combination thereof). For example, the sleds can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Although a computer is largely described by the above discussion of FIG. 5, other types of systems to which the above described invention can be applied and are also partially or wholly described by FIG. 5 are communication systems such as routers, switches, and base stations.

FIG. 6 depicts an example of a data center. Various embodiments can be used in or with the data center of FIG. 6. As shown in FIG. 6, data center 600 may include an optical fabric 612. Optical fabric 612 may generally include a combination of optical signaling media (such as optical cabling) and optical switching infrastructure via which any particular sled in data center 600 can send signals to (and receive signals from) the other sleds in data center 600. However, optical, wireless, and/or electrical signals can be transmitted using fabric 612. The signaling connectivity that optical fabric 612 provides to any given sled may include connectivity both to other sleds in a same rack and sleds in other racks.

Data center 600 includes four racks 602A to 602D and racks 602A to 602D house respective pairs of sleds 604A-1 and 604A-2, 604B-1 and 604B-2, 604C-1 and 604C-2, and 604D-1 and 604D-2. Thus, in this example, data center 600 includes a total of eight sleds. Optical fabric 612 can provide sled signaling connectivity with one or more of the seven other sleds. For example, via optical fabric 612, sled 604A-1 in rack 602A may possess signaling connectivity with sled 604A-2 in rack 602A, as well as the six other sleds 604B-1, 604B-2, 604C-1, 604C-2, 604D-1, and 604D-2 that are distributed among the other racks 602B, 602C, and 602D of data center 600. The embodiments are not limited to this example. For example, fabric 612 can provide optical and/or electrical signaling.

FIG. 7 depicts an environment 700 that includes multiple computing racks 702, each including a Top of Rack (ToR) switch 704, a pod manager 706, and a plurality of pooled system drawers. Generally, the pooled system drawers may include pooled compute drawers and pooled storage drawers to, e.g., effect a disaggregated computing system. Optionally, the pooled system drawers may also include pooled memory drawers and pooled Input/Output (I/O) drawers. In the illustrated embodiment the pooled system drawers include an INTEL® XEON® pooled computer drawer 708, and INTEL® ATOM™ pooled compute drawer 710, a pooled storage drawer 712, a pooled memory drawer 714, and a pooled I/O drawer 716. Each of the pooled system drawers is connected to ToR switch 704 via a high-speed link 718, such as a 40 Gigabit/second (Gb/s) or 100 Gb/s Ethernet link or an 100+ Gb/s Silicon Photonics (SiPh) optical link. In one embodiment high-speed link 718 comprises an 600 Gb/s SiPh optical link.

Again, the drawers can be designed according to any specifications promulgated by the Open Compute Project (OCP) or other disaggregated computing effort, which strives to modularize main architectural computer components into rack-pluggable components (e.g., a rack pluggable processing component, a rack pluggable memory component, a rack pluggable storage component, a rack pluggable accelerator component, etc.).

Multiple of the computing racks 700 may be interconnected via their ToR switches 704 (e.g., to a pod-level switch or data center switch), as illustrated by connections to a network 720. In some embodiments, groups of computing racks 702 are managed as separate pods via pod manager(s) 706. In one embodiment, a single pod manager is used to manage all of the racks in the pod. Alternatively, distributed pod managers may be used for pod management operations. RSD environment 700 further includes a management interface 722 that is used to manage various aspects of the RSD environment. This includes managing rack configuration, with corresponding parameters stored as rack configuration data 724.

Any of the systems, data centers or racks discussed above, apart from being integrated in a typical data center, can also be implemented in other environments such as within a bay station, or other micro-data center, e.g., at the edge of a network.

Embodiments herein may be implemented in various types of computing, smart phones, tablets, personal computers, and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, each blade includes components common to conventional servers, including a main printed circuit board (main board) providing internal wiring (e.g., buses) for coupling appropriate integrated circuits (ICs) and other components mounted to the board.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds, and other design or performance constraints, as desired for a given implementation.

Some examples may be implemented using or as an article of manufacture or at least one computer-readable medium. A computer-readable medium may include a non-transitory storage medium to store program code. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the program code implements various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled, and/or interpreted programming language.

To the extent any of the teachings above can be embodied in a semiconductor chip, a description of a circuit design of the semiconductor chip for eventual targeting toward a semiconductor manufacturing process can take the form of various formats such as a (e.g., VHDL or Verilog) register transfer level (RTL) circuit description, a gate level circuit description, a transistor level circuit description or mask description or various combinations thereof. Such circuit descriptions, sometimes referred to as "IP Cores", are commonly embodied on one or more computer readable storage media (such as one or more CD-ROMs or other type of storage technology) and provided to and/or otherwise processed by and/or for a circuit design synthesis tool and/or mask generation tool. Such circuit descriptions may also be embedded with program code to be processed by a computer that implements the circuit design synthesis tool and/or mask generation tool.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software, and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences may also be performed according to alternative embodiments. Furthermore, additional sequences may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The invention claimed is:

1. A method, comprising:
   determining that a memory page is in an active state or an idle state from meta data that is maintained for the memory page;
   recording a past history of active/idle state determinations that were previously made for the memory page;
   training, at a sampling interval, a neural network on the past history of the memory page;
   training, at a different sampling interval, a different neural network on the past history of the memory page;
   using both the neural network and the different neural network to predict a future active state or a future idle state for the memory page;
   determining a location for the memory page based on the past history of the memory page and the predicted future state of the memory page, the location being a faster memory or a slower memory; and
   moving the memory page to the location.

2. The method of claim 1 wherein the faster memory is a local memory and the slower memory is a remote memory.

3. The method of claim 2 wherein the remote memory is a pooled memory.

4. The method of claim 1 wherein the sampling interval is based on each update to the past history of the memory page and the different sampling interval is based on multiple updates to the past history of the memory page.

5. The method of claim 4 wherein using both the neural network and the different neural network to predict the future active state or the future idle state for the memory page comprises using both the neural network and the different neural network following a same time increment.

6. The method of claim 1 wherein the method further comprises:

observing active/idle state determinations made for the memory page after the moving of the memory page;

recognizing that the location was an incorrect determination for the memory page; and changing a formulation used for the determining.

7. The method of claim 1 wherein the method further comprises maintaining a list of memory pages and their determined locations.

8. A non-transitory machine readable storage medium containing program code that when processed by a processor, cause the processor to:

determine that a memory page is in an active state or an idle state from meta data that is maintained for the memory page;

record a past history of active/idle state determinations that were previously made for the memory page;

train, at a sampling interval, a neural network on the past history of the memory page;

train, at a different sampling interval, a different neural network on the past history of the memory page;

use both the neural network and the different neural network to predict a future active state or a future idle state for the memory page;

determine a location for the memory page based on the past history of the memory page and the predicted future state of the memory page, the location being a faster memory or a slower memory; and move the memory page to the location.

9. The non-transitory machine readable storage medium of claim 8 wherein the faster memory is a local memory and the slower memory is a remote memory.

10. The non-transitory machine readable storage medium of claim 9 wherein the remote memory is a pooled memory.

11. The non-transitory machine readable storage medium of claim 8 wherein the sampling interval is based on each update to the past history of the memory page and the different sampling interval is based on multiple updates to the past history of the memory page.

12. The non-transitory machine readable storage medium of claim 11 wherein to use both the neural network and the different neural network to predict the future active state or the future idle state for the memory page comprises the program code to cause the processor to use both the neural network and the different neural network following a same time increment.

13. The non-transitory machine readable storage medium of claim 12 wherein the program code is to further cause the processor to:

observe active/idle state determinations made for the memory page after the moving of the memory page;

recognize that the location was an incorrect determination for the memory page; and change a formulation used for the determining.

14. The non-transitory machine readable storage medium of claim 8 wherein the program code is to further cause the processor to maintain a list of memory pages and their determined locations.

15. A data center, comprising:

a plurality of rack mounted computers communicatively coupled by a network;

a memory pool coupled to the network;

a processor of one of the rack mounted computers to execute program code stored in a machine readable medium to perform a method, comprising:

determining that a memory page is in an active state or an idle state from meta data that is maintained for the memory page;

recording a past history of active/idle state determinations that were previously made for the memory page;

training, at a sampling interval, a neural network on the past history of the memory page;

training, at a different sampling interval longer, a different neural network on the past history of the memory page;

using both the neural network and the different neural network to predict a future active state or a future idle state for the memory page;

determining a location for the memory page based on the past history of the memory page and the predicted future state of the memory page, the location being a local memory to the processor or the memory pool; and moving the memory page to the location.

16. The data center of claim 15 wherein the sampling interval is based on each update to the past history of the memory page and the different sampling interval is based on multiple updates to the past history of the memory page.

17. The data center of claim 16 wherein using both the neural network and the different neural network to predict the future active state or the future idle state for the memory page comprises using both the neural network and the different neural network following a same time increment.

18. The data center of claim 15 wherein the method further comprises:

training, at a second different sampling interval, a second different neural network on the past history of the memory page; and using the neural network, the different neural network and the second different neural network to predict the future active state or the future idle state for the memory page.

19. The data center of claim 18 wherein the sampling interval is based on each update to the past history of the memory page, the different sampling interval is based on every second update to the past history of the memory page, and the second different sampling interval is based on every third update to the past history of the memory page.

20. The data center of claim 19 wherein using the neural network, the different neural network and the second neural network to predict the future active state or the future idle state for the memory page comprises using the neural network, the different neural network and the second different neural network following a same time increment.

* * * * *